(12) United States Patent
Castleman et al.

(10) Patent No.: US 6,497,415 B2
(45) Date of Patent: Dec. 24, 2002

(54) ELASTOMER ENERGIZED ROD SEAL

(75) Inventors: Larry J. Castleman, New Haven, IN (US); Gert Iverson, Helsingoer (DK)

(73) Assignee: TI Specialty Polymer Products, Inc., Fort Wayne, IN (US)

( * ) Notice: Subject to any disclaimer, the term of this patent is extended or adjusted under 35 U.S.C. 154(b) by 0 days.

(21) Appl. No.: 09/912,170

(22) Filed: Jul. 21, 2001

(65) Prior Publication Data

US 2002/0158420 A1 Oct. 31, 2002

Related U.S. Application Data

(60) Provisional application No. 60/220,275, filed on Jul. 24, 2000.

(51) Int. Cl.$^7$ ................................................. F16J 15/32
(52) U.S. Cl. ...................... 277/549; 277/500; 277/553; 277/560
(58) Field of Search ................................ 277/500, 549, 277/553, 556, 560

(56) References Cited

U.S. PATENT DOCUMENTS

| | | | | |
|---|---|---|---|---|
| 2,772,900 A | * | 12/1956 | Campbell | 277/556 |
| 3,469,854 A | | 9/1969 | Linwood | |
| RE28,105 E | | 8/1974 | Traub | |
| 3,880,745 A | * | 4/1975 | Shaw | 204/224 M |
| 3,970,321 A | * | 7/1976 | Dechavanne | 277/556 |
| 4,176,848 A | | 12/1979 | Lafuze | |
| 4,560,174 A | | 12/1985 | Bisi | |
| 4,702,482 A | | 10/1987 | Oseman | |
| 4,709,932 A | * | 12/1987 | Edlund et al. | 277/550 |
| 4,723,782 A | * | 2/1988 | Muller | 277/589 |
| 4,819,952 A | * | 4/1989 | Edlund | 277/550 |
| 5,082,295 A | | 1/1992 | Wetzel | |
| 5,104,131 A | * | 4/1992 | Edlund et al. | 277/556 |
| 5,112,039 A | | 5/1992 | Walker | |
| 5,249,813 A | * | 10/1993 | Botto | 277/556 |
| 5,875,861 A | | 3/1999 | Daly et al. | |

* cited by examiner

*Primary Examiner*—Anthony Knight
*Assistant Examiner*—E Peavey
(74) *Attorney, Agent, or Firm*—Randall J. Knuth

(57) ABSTRACT

The present seal system is in two parts. First is that of an elastomer energizer, which may be in the shape of a square ring, o-ring, or an other custom design for energizing the seal system. Second is that of a seal element having a particular geometry and composition. The geometric layout of the seal element ensures firm contact between the seal and groove bottom, independently of the seal pressure and radial position of the moving part, and concentrates contact forces against the moving part by means of a seal apex. In the installed state, the seal is forced into contact with the groove bottom by having an outer diameter matching or exceeding that of the groove bottom, and a radial height exceeding that of the housing groove. Further, the influence of the compression ring or energizer is balanced out by positioning the seal apex near the axial position of the center of the energizer. The seal apex itself is defined by an inlet angle upstream of the apex of preferably more than 30° to the moving part, and a downstream slip angle of greater than 5° preferably greater than 7°.

16 Claims, 2 Drawing Sheets

APEX UNDER CENTROID OF THE ELASTOMER

APEX 25% BEHIND THE CENTROID OF THE ELASTOMER

APEX 25% AHEAD OF THE CENTROID OF THE ELASTOMER

BONDED ELASTOMER

ELASTOMER ENERGIZED ROD SEAL

This application claims the benefit of Provisional application Ser. No. 60/220,275, filed Jul. 24, 2000.

BACKGROUND OF THE INVENTION

1. Field of the Invention

The present invention relates to an improved sealing element which includes an energizer element and a solid plastic element which forms a sealing surface.

2. Description of the Related Art

Seal elements are commonly utilized in machines having parts which move relative to each other and which include fluid which is to be retained in a specific portion of the machine. Seal elements may additionally be utilized between static members of machines in situations in which a fluid is to be kept within a certain portion of the machine. One of the machine parts typically includes a gland which is designed to house the sealing element. Examples of such seals include the annular seals utilized in hydraulic mechanisms to seal between the piston and the cylinder of the hydraulic mechanism. In these configurations, the gland may be formed in the piston or the cylinder of the hydraulic element.

Prior seal elements have included plastic sealing surfaces which cover the entire sealing surface of the seal. These plastic seal elements were in some cases made from polytetrafluoroethylene (PTFE).

Many known sealing arrangements utilize a two piece configuration with an energizer/seal element being first placed in the gland and a second separate sealing element then being placed adjacent the energizer/seal element. Configurations of this type are problematic in that they are difficult to install. Two piece configurations are additionally problematic as the additional seal parts create additional gap tolerance concerns.

What is need in the art is a seal arrangement having improved leakage control, reduced friction, and increased lifetime for sealing environments adapted for reciprocation, rotary, oscillating, and static uses.

What is needed in the art is a seal arrangement which allows a portion of the seal to contact the surface to be sealed and which is able to create controlled and non-linear load patterns at the point of seal contact.

SUMMARY OF THE INVENTION

The present invention is directed to overcome the above-mentioned shortcomings in the art, and provide a sealing apparatus with the unique construction that tends to prohibit seal rotation during operation with superior fluid film control. The present invention is in two parts. First is that of an elastomer energizer, which may be in the shape of a square ring, o-ring, or an other custom design for energizing the seal system. Second is that of a seal element having a particular geometry and composition.

The geometric layout of the seal element ensures firm contact between the seal and groove bottom, independently of the seal pressure and radial position of the moving part, and concentrates contact forces against the moving part by means of a seal apex. In the installed state, the seal is forced into contact with the groove bottom by having an outer diameter matching or exceeding that of the groove bottom, and a radial height exceeding that of the housing groove. Further, the influence of the compression ring or energizer is balanced out by positioning the seal apex near the axial position of the center of the energizer. The seal apex itself is defined by an inlet angle upstream of the apex of preferably more than 30° to the moving part, and a downstream slip angle of greater than 5° preferably greater than 7°.

Depending upon the geometry of the seal, the sealed pressure produces a net torque on the angular seal, which works to force the assembly down upon the moving part, or alternatively to improve contact with the groove bottom. The direction and relative magnitude of this improvement can be approximated by the ratio of radial groove height divided by the axial distance from the seal apex to where the seal meets the groove bottom. When the ratio exceeds one, seal contact with the groove bottom is improved with pressure, and in the present invention this ratio exceed 1.25.

In order to efficiently employ the above-described torque to control seal contact against the housing groove and the moving surface, the seal member must possess sufficient rigidity to limit the influences of deformation. The present invention is ensured by designing the seal in such a way that a straight line can be drawn from the seal apex through the solid body of the seal to the radial line defining the downstream wall of the seal, and that the first line forms an angle with the moving part of at least 40°, but possibly greater.

Flexibility to allow radial displacement of the moving part is determined by the radial height of the sealing element, defined as that portion of the seal element which lies downstream of the radial line going through the downstream end position of the energizer. In the present invention, a line can be drawn downstream from the point where this line intersects the moving surface forming an angle with the moving surface of at least 7° without contacting the solid part of the seal.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
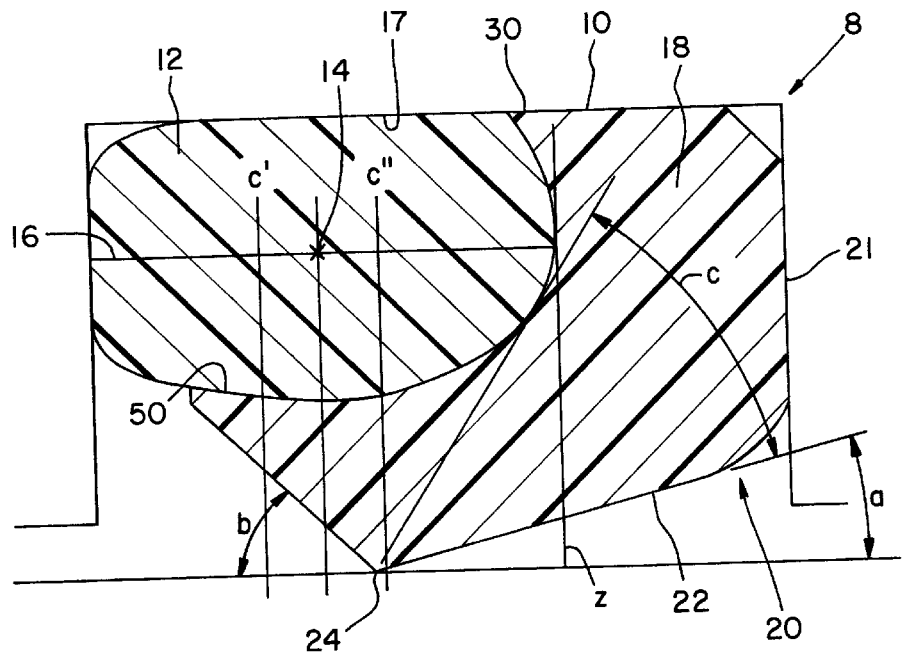
FIG. 1 is a sectional view of an annular seal formed in accordance with the teachings of the present invention.

Referring now to the drawings and particularly to FIG. 1, there is shown a seal 8 in accordance with the teachings of the current invention. The annular configuration of seal 8 illustrated in FIG. 1 is not meant to be limiting in any way as the seal structure taught by the current invention may be utilized in seals of differing configuration, such as linear or elliptical seals, for example and can be utilized in reciprocation, rotary, oscillating, and static configurations. Annular seal 8, as shown, generally seals between two concentric members with annular seal 8 being held in place by a gland contained within either of the concentric members.

As explained above, the sealing geometry utilizes an energizer/seal element 12 having a semicircular or rectangular surface which is designed to be first inserted into the gland.

Elastomeric energizer 12 may be made of known materials, methods, shapes, and sizes including but not limited to, square, O and custom shapes.

Seal element 18 includes a top surface 10 that is sized in length sufficient to interfere with the groove channel and prevent seal element rotation toward the dynamic surface. The further contact of energizer 12 in the embodiment of FIG. 1 occurs at line Z, a theoretical line, dropped through seal element 18 tangent to the furthest edge, the furthest nearest edge of the energizer 12.

Another feature of the seal element 18 is that of a smooth radius corner 20, which makes a smooth transition from the rear half of the surface 22, which initially begins at seal apex 24 to side surface 21. As shown in FIG. 1, the bottom surface 22 includes a smooth radius corner 20. Such smooth radius without any steps, chamfers, or sharp edges is called fully blended, which assists in fluid film control under dynamic motion. No particular requirement of a smooth or fully blended surface is necessitated in connection with seal element side surface 21.

Another geometrical feature of seal element 18 is that of the bottom surface 22 having an angle, in comparison with an opposite horizontal lines of greater than 5°, which is referenced as angle A. Preferably, angle A is greater than or equal to 7°. Such angle prevents a shear effect from occurring and keeps fluid in laminar flow against element 18. The angle A has been found to provide better fluid film control.

Another unique feature of the present invention is that of an extended radius towards the groove outer diameter, along top surface 10. Such distance is identified as 30, a portion of top surface 10 extends past energizer 12 from line Z, a sufficient distance to deflect force to the groove outer diameter. Such portion of top surface 10 better protects the energizer element 12 under pressure, giving it extrusion protection.

The front bottom surface 36, has an angle of approximately greater than or equal to 30°, and at one end forms together bottom surface 22 to form seal apex 24. The angle B, formed between a horizontal line and front bottom surface 26, may vary dependent upon seal geometry and necessary size for the pedestal surface 50, which serves as a support for energizer 12. Of critical importance, is that pedestal 50 is sufficient in size so that, at all times during seal operation, the centroid 14 of energizer 12 is supported thereby. Pedestal surface 50 therefore forms an extended surface for the energizer, ensuring proper seating and stability of seal 8 under pressure, and more particularly under low pressure situations.

An associated feature, is that for proper torque control of the seal system and promoting seal contact against the housing groove and moving surface, a straight line must be able to be drawn through seal element 18 from apex 24 to a radial line, in this case Z, defining the upstream wall of seal element 18, adjacent energizer 12. An angle C, thereby created by the straight line and opposite horizontal line and surface 22, should A form an angle that is at least 40°.

Figure 2:
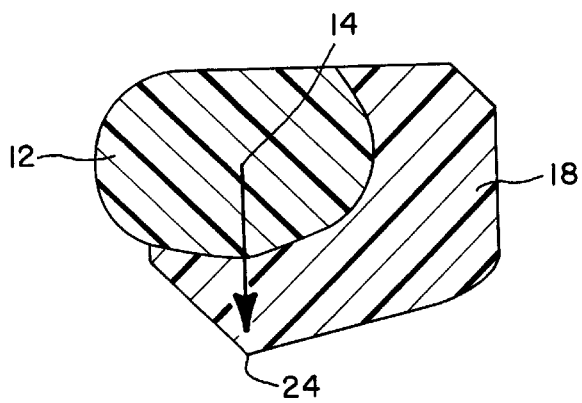
FIG. 2 is a sectional view of a seal element of the present invention.
Figure 3:
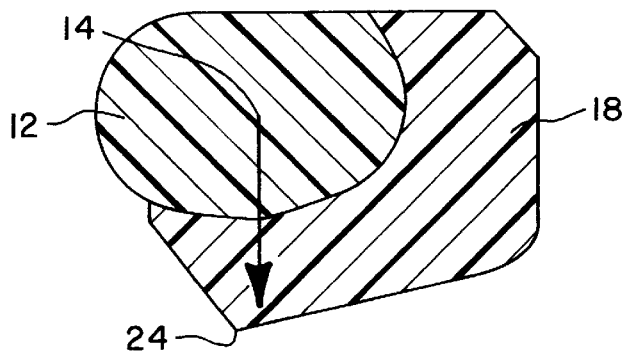
FIG. 3 is a sectional view of a seal element of the present invention.
Figure 4:
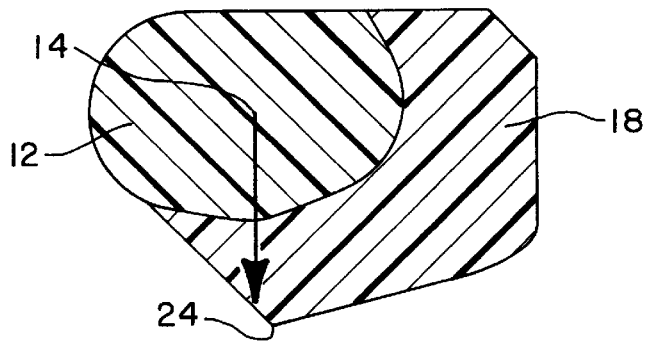
FIG. 4 is a sectional view of a seal element of the present invention.

In another form of the invention, the geometry of energizer centroid 14 and seal element apex 24 is defined. Such definition is shown in FIGS. 2–4 in which the apex 24 is located under centroid 14, or 25% plus or minus the axial width 16 of seal element 12 from centroid 14. Such 25% plus or minus distances from centroid 14 are shown in FIG. 1 as C' and C".

Construction materials from seal element 18 range from elastomeric in nature to structural plastic, including but not limited to, polytetrafluoroethylene (PTFE), polyurethane, high modulus plastics, structural thermalsets, polyimides, PPS, and various combination of such materials may be utilized for the seal element 18.

Figure 5:
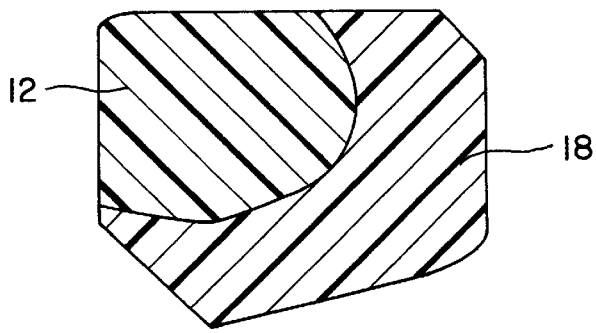
FIG. 5 is a sectional view of a seal element of the present invention.

Additionally, as shown in FIG. 5, seal element 18 may be bonded with energizer 12, as known in the art, with adhesive or alternate types of connection materials or methods.

In addition to the embodiment shown in FIG. 1, other embodiments of the invention may include particularly combined features as of the above-described preferred embodiment. As shown in the chart below, various features may be combined to form an operational seal 8 with superior qualities such as leakage control, friction reduction, and increased lifetime by combining the features.

| EMBODIMENTS | 1 | 2 | 3 | 4 | 5 | 6 | 7 | 8 |
|---|---|---|---|---|---|---|---|---|
| Top surface (10) | X | | X | | | X | | |
| Smooth radius corner (20) | X | X | X | X | X | X | | |
| Extended top surface past energizer (30) | X | | | | | | X | X |
| Bottom surface angle >5° (A) | X | X | | X | | | | |
| Centroid over pedestal surface (50) | X | | | X | | | | |
| Centroid over apex ±25 | | | | | | | | X |

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. Annular seal for sealing between a static and a dynamic machine part, therebetween which a fluid or gas seal is required, the annular seal being made of a resilient material and energized by a surrounding compression ring, the annular seal being installed with the compression ring in a common, rectangular housing groove such that it separates the compression ring from a moving surface of the dynamic machine part and the downstream wall of the housing groove, characterized by the outer diameter of the seal meeting or exceeding that of the groove bottom, the seal having a seal apex, the seal being configured for concentrating contact forces against the moving surface solely via the seal apex.

2. The seal of claim 1 in which the outer diameter of the seal exceeds that of the groove bottom by between 0 and 0.75 mm.

3. The seal of claim 1 in which the radial height of the seal meets or exceeds that of the housing groove.

4. The seal of claim 1 in which the radial height of the seal exceeds that of the housing groove by between 5% and 15%.

5. The seal of claim 1 in which the radial height of the seal exceeds that of the housing groove by between 7% and 10%.

6. The seal of claim 1 in which the seal is laid out with the seal apex defined by an upstream seal angle of more than 40° and a downstream slip angle of more than 5°, the seal apex is formed one of by the intersection of inlet and slip angle and by a flat or a convex shape with a width of no more than 0.75 mm.

7. The seal of claim 1 in which the seal is laid out with the seal apex defined by an upstream seal angle of more than 40° and a downstream slip angle of more than 10°, the seal apex is formed one of by the intersection of inlet and slip angle and by a flat or a convex shape with a width of no more than 0.75 mm.

8. The seal of claim 1 in which the seal is laid out with the apex defined by an upstream seal angle between 40° and 50° and a downstream slip angle between 12° and 17°.

9. The seal of claim 1 in which the position of the seal apex is axially located near the center of the compression ring in its installed state.

10. The seal of claim 1 in which the seal body is such laid out that the ratio Radial groove height/axial distance from the seal apex to where the seal meets te groove bottom, exceeds 1.25.

11. The seal of claim 1 in which the seal body is such laid out that the ratio Radial groove height/axial distance from the seal apex to where the seal meets the groove bottom, exceeds 1.75.

12. The seal of claim 1 in which the seal body is such laid out that a straight line can be drawn from the seal apex through the body of the seal to the radial line defining the downstream wall of the seal, and that the first line forms an angle with the moving part of at least 40°.

13. The seal of claim 1 in which the seal body is such laid out that a straight line can be drawn from the seal apex through the body of the seal to the radial line defining the downstream wall of the seal, and that the first line forms an angle with the moving part of at least 50°.

14. From seal of claim 1 in which the the radial line going through the downstream end position of the compression ring the seal is such laid out, that a line can be drawn downstream from the point where the radial line intersects the moving surface, forming an angle with the moving surface of at least 7° without contacting the seal body.

15. From seal of claim 1 in which the the radial line going through the downstream end position of the compression ring the seal is such laid out, that a line can be drawn downstream from the point where the radial line intersects the moving surface, forming an angle with the moving surface of at least 14° without contacting the seal body.

16. From seal of claim 1 in which the the radial line going through the downstream end position of the compression ring the seal is such laid out, that a line can be drawn downstream from the point where the radial line intersects the moving surface, forming an angle with the moving surface of at least 18 and not more than 24° without contacting the seal body.

* * * * *